United States Patent [19]

Sheng-Jung

[11] 4,339,888
[45] Jul. 20, 1982

[54] REMOTE CONTROL FISHING DEVICE WITH AUTOMATIC LINE RETRIEVAL

[76] Inventor: Tseng Sheng-Jung, No. 50 Chiung Tai Rd., Hsin Chuang Chen, Taipei, Taiwan

[21] Appl. No.: 32,408

[22] Filed: Apr. 23, 1979

[51] Int. Cl.³ .............................................. A01K 97/00
[52] U.S. Cl. ..................................................... 43/26.1
[58] Field of Search ................... 43/4, 4.5, 26.1, 27.4; 46/250, 93

[56] References Cited

U.S. PATENT DOCUMENTS

| | | | |
|---|---|---|---|
| 2,951,307 | 9/1960 | Joy | 43/26.1 |
| 3,106,796 | 10/1963 | Friedland | 43/26.1 |
| 3,599,370 | 8/1971 | Armata | 43/26.1 |

FOREIGN PATENT DOCUMENTS

| | | | |
|---|---|---|---|
| 276439 | 1/1966 | Australia | 43/26.1 |
| 699743 | 12/1964 | Canada | 43/26.1 |

*Primary Examiner*—Nicholas P. Godici
*Attorney, Agent, or Firm*—Holman and Stern

[57] ABSTRACT

Disclosed is a combination remote control fishing device comprising a remote control device for carrying a line/float assembly to a desired location in the water, an automatic capstan for line recovering and releasing, and control components for these items. A variable slippage clutch is provided on the capstan which permits high speed retrieval of small or weakened fishes. Clutch slippage permits operation of the capstan motor without damage when a large or very strong fish is struggling on the line during retrieval.

5 Claims, 24 Drawing Figures

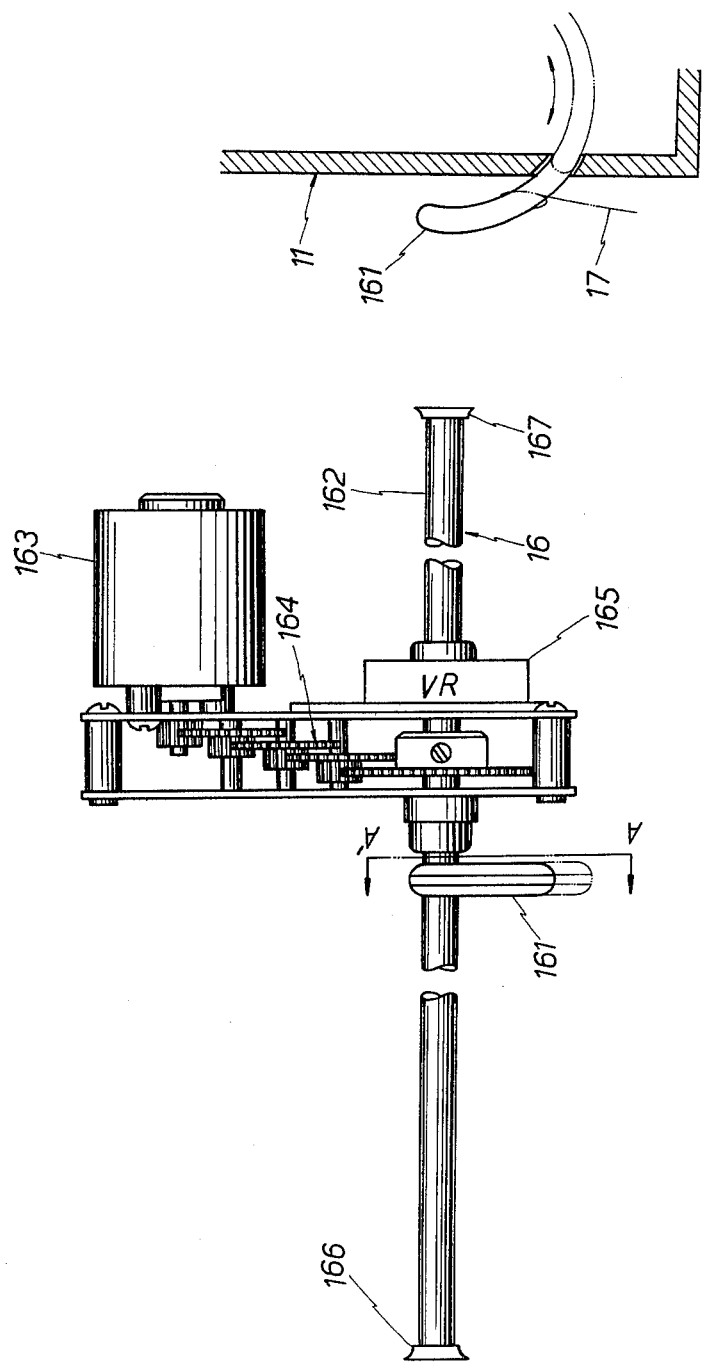

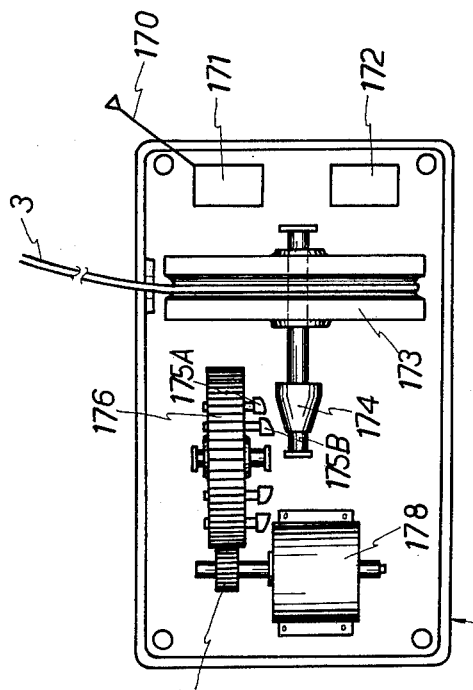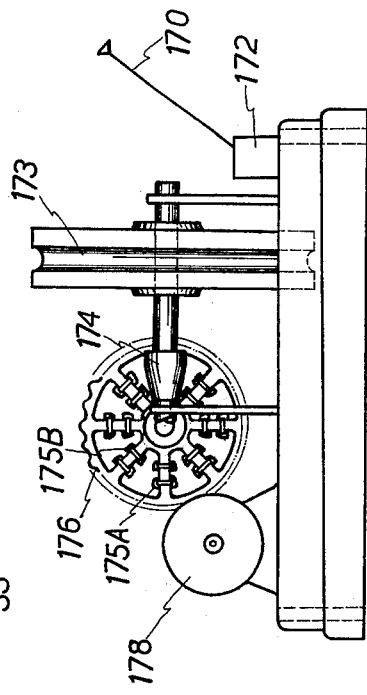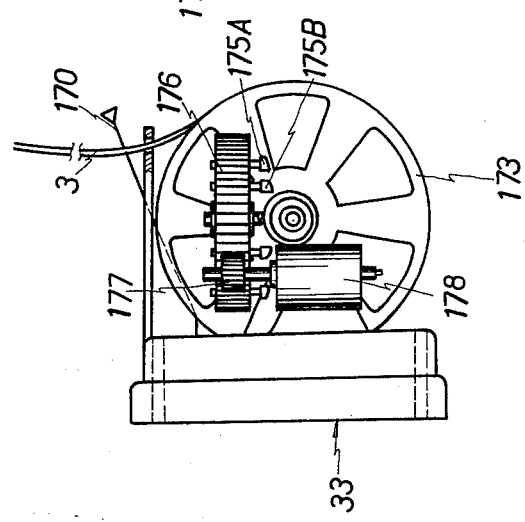

REMOTE CONTROL FISHING DEVICE WITH AUTOMATIC LINE RETRIEVAL

BACKGROUND OF THE INVENTION

The present invention relates generally to remote control fishing devices and specifically to remote control fishing devices having an automatic line retrieval system.

In the past capstan systems either had to be very large in order to be capable of bringing in large fish or the retrieval motor would stall when the fish was being retrieved causing the motors to be damaged and/or ruined. Thus there has developed a need for some manner in which to protect capstan retrieval devices in automatic fishing systems from being overloaded by extremely large fish.

SUMMARY OF THE INVENTION

It is therefore an object of the present invention to provide a remote control fishing device which has an automatic capstan capable of recovering fish of any size without being overloaded.

It is a still further object of the present invention to provide a remote control fishing device which utilizes a sliding mechanism to permit the retrieval motor to continue rotation even though the fishing line is stopped or being let out.

It is a further object of the present invention to provide a remote control boat which is capable of towing a float to a designated position in the water, and releasing the float and returning to shore.

A still further object is to provide a remote control boat capable of towing a float to a predetermined position with the float automatically releasing a fishing line to a predetermined depth and then triggering an automatic capstan retrieval system when a fish has been hooked on the fishing line.

The above and other objects are achieved by providing in addition to a radio controlled boat and a float system capable of being towed by said boat, a capstan retrieval system. The float has a motor for the purpose of releasing fishing line with an automatic transmitter which is put into operation when a fish is hooked. The transmitter signals a radio receiver in the automatic capstan retrieval system located on shore which then energizes a retrieval motor. A slipping clutch between the motor and capstan will prevent the motor from being overloaded in the event an extremely large fish has been inadvertently hooked.

BRIEF DESCRIPTION OF THE DRAWINGS

A more complete appreciation of the present invention and many of the attended advantages thereof will be readily apparent by reference to the accompanying drawings wherein:

FIG. 4a is a top view of the tow line release mechanism for the radio controlled boat of the present invention;

FIG. 4b is partially in section and illustrates the tow line release function;

FIGS. 11a, 11b, and 11c are top, side and end views of the automatic capstan line recovering system;

DESCRIPTION OF A PREFERRED EMBODIMENT

Figure 1:
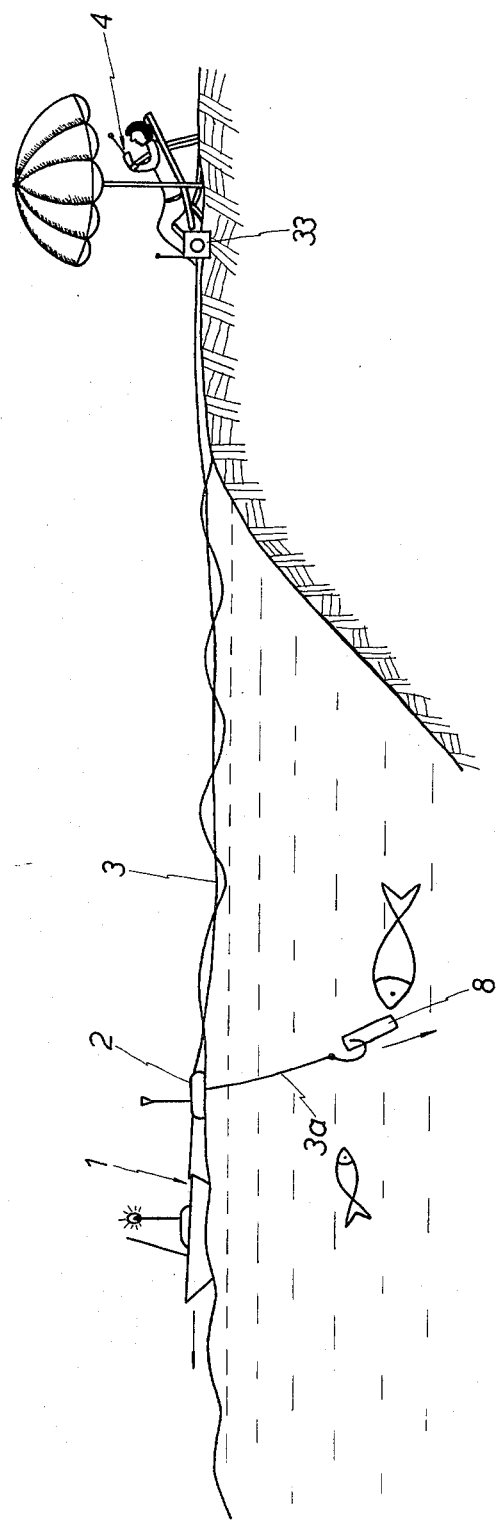
FIG. 1 is an illustrational view showing the operation of the fishing system.

Referring now more particularly to the drawings wherein like numerals designate similar parts throughout the several views, FIG. 1 illustrates a remote control boat 1 which is towing a fishing float 2 under the operation and control of a human operator operating the remote control transmitter 4. As indicated, the fishing float 2 is connected by way of primary fishing line 3 to an automatic capstan retrieval system 33. Additionally the fishing float has a secondary fishing line 3a which is being lowered from the float and has bait 8 attached thereto.

Figure 2A:
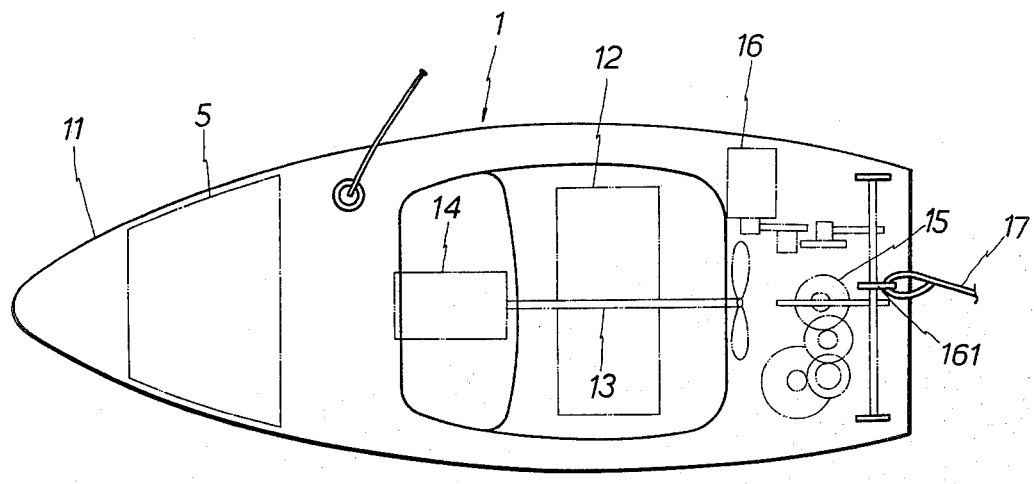
FIGS. 2a and 2b are top and side views, respectively, of the radio-controlled boat in accordance with the present invention.
Figure 2B:
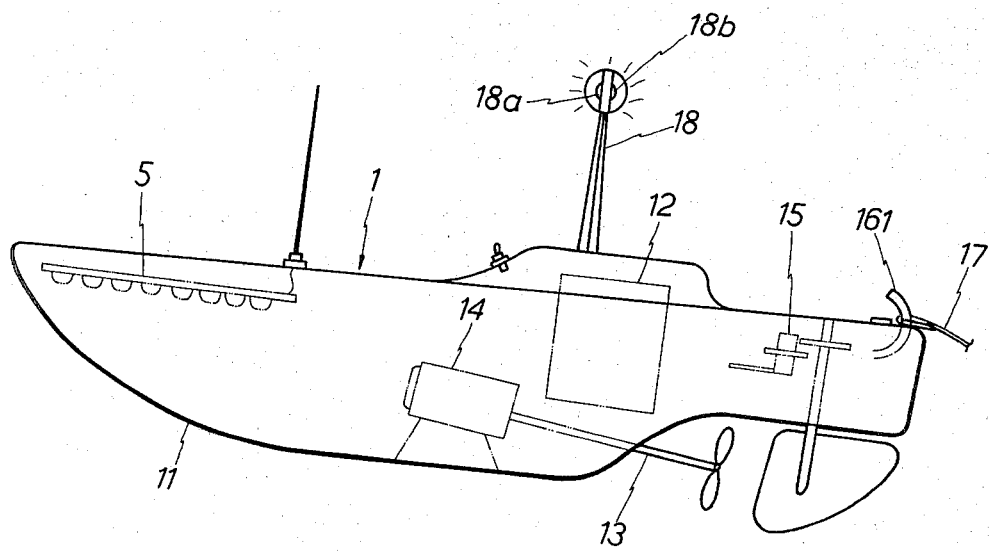
Figure 3:
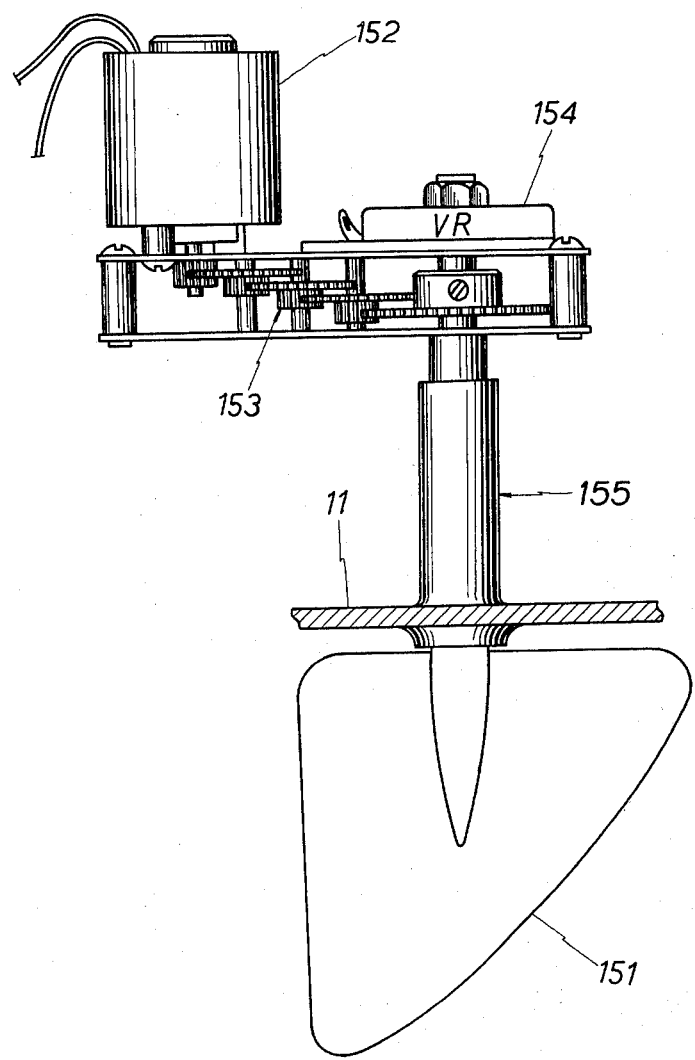
FIG. 3 is a side view of the radio controlled boat steering system in accordance with the present invention.

The remote control boat as can be seen by reference to FIGS. 2a and 2b, includes a hull 11 wherein a propulsion motor 14 is situated for the purpose of propelling the boat through drive shaft and propeller 13. A receiving antenna is connected to the remote control receiver 5 (more clearly shown in FIG. 7) for the purpose of providing inputs to the control circuits for the steering servo motor apparatus 15 and the tow release servo motor apparatus 16. The propulsion motor 14, remote control receiver 5, and servo motor devices 15 and 16 are all powered along with pilot light 18 by a battery 12. The steering of the remote control boat is accomplished by means of signals received by the remote control receiver 5, processed by control circuits 5a (as shown in FIG. 8) and applied to the rudder control servo motor as shown in FIG. 3. The servo motor acts through an appropriate gearing system 153 to control the rudder 151 through a thru-hull fitting 155 which has been placed in the hull 11 of the remote control boat. Positional feed back information is provided by rheostat 154.

As can be noted in FIGS. 2a and 2b, a tow line 17 connects the remote control boat 1 to the fishing float 2 and is retained by means of hook 161. A tow line release servo motor 163 operating through an appropriate gear train 164 will rotate rod 162 about pivot points 166 and 167 causing hook 161 to be withdrawn into the hull of the boat 11 (as can be seen in FIGS. 4a and 4b) thus releasing the loop of tow line 17. As in the rudder control system, positional feed back information is provided by rheostat 165.

Figure 5A:
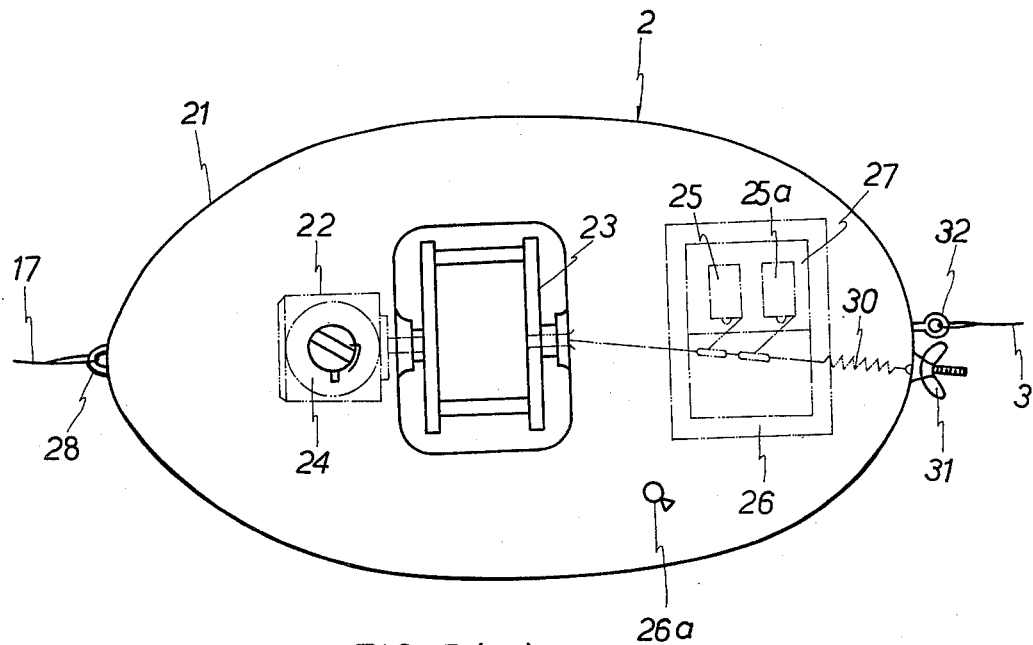
FIGS. 5a and 5b are top and side cross sectional views, respectively, of the fishing float of the present invention.
Figure 5B:
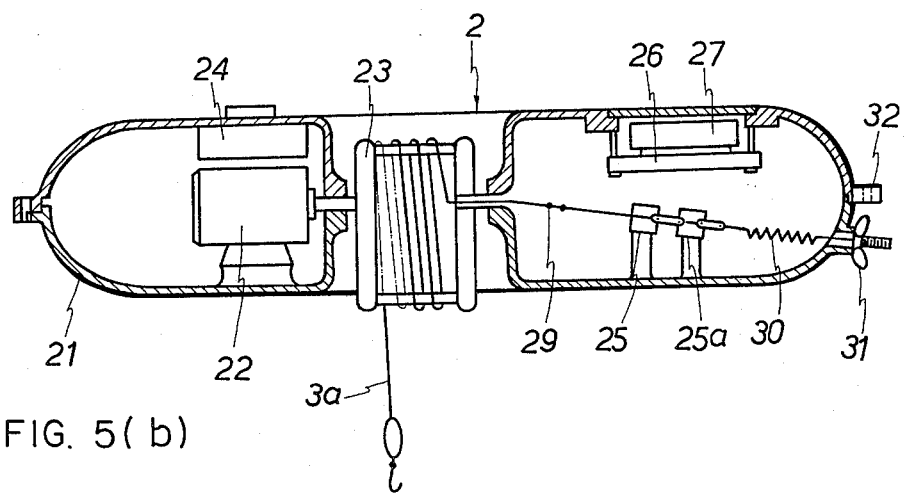
Figure 5C:
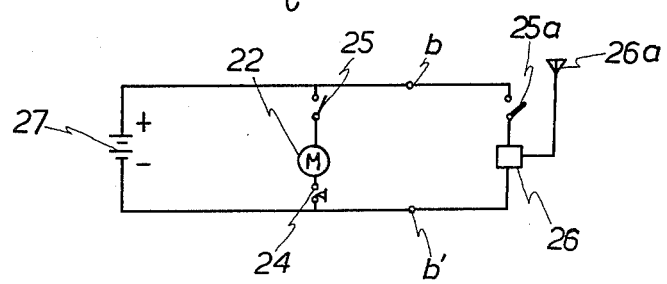
FIG. 5c is an electrical schematic of the fishing float line control motor and capstan activation transmitter energization switches.

The fishing float 2 is connected to the tow line 17 by means of ring 28 and connected to primary fishing line 3 by means of ring 32. A secondary fishing line reel 23 has secondary fishing line 3a coiled around it and is powered by fishing float line control motor 22, as can more clearly be seen in FIGS. 5a and 5b. The operation of the line control motor 22 is under the control of timer 24 which actuates the motor after a predetermined time delay. Affixed to the hull 21 of the fishing float 2 are 2 limit switches 25 and 25a. Switch 25 is connected through a swivel joint 29 to the secondary fishing line 3a such that when the line is extended, the pull on limit switch 25 opens the switch turning off line control motor 22 by disconnecting battery 27 therefrom. When a fish is hooked on secondary fishing line 3a, the pulling force through swivel joint 29 on limit switch 25a energizes the capstan activation transmitter 26. The amount of force or pull on secondary fishing line 3a is adjusted by the preload placed on limit switch 25a by spring 30 and adjustable wing nut 31. As can be seen in FIG. 5c, closure of limit switch 25a energizes the capstan activation transmitter which transmits a suitable radio signal over fishing float antenna 26a.

Figure 6:
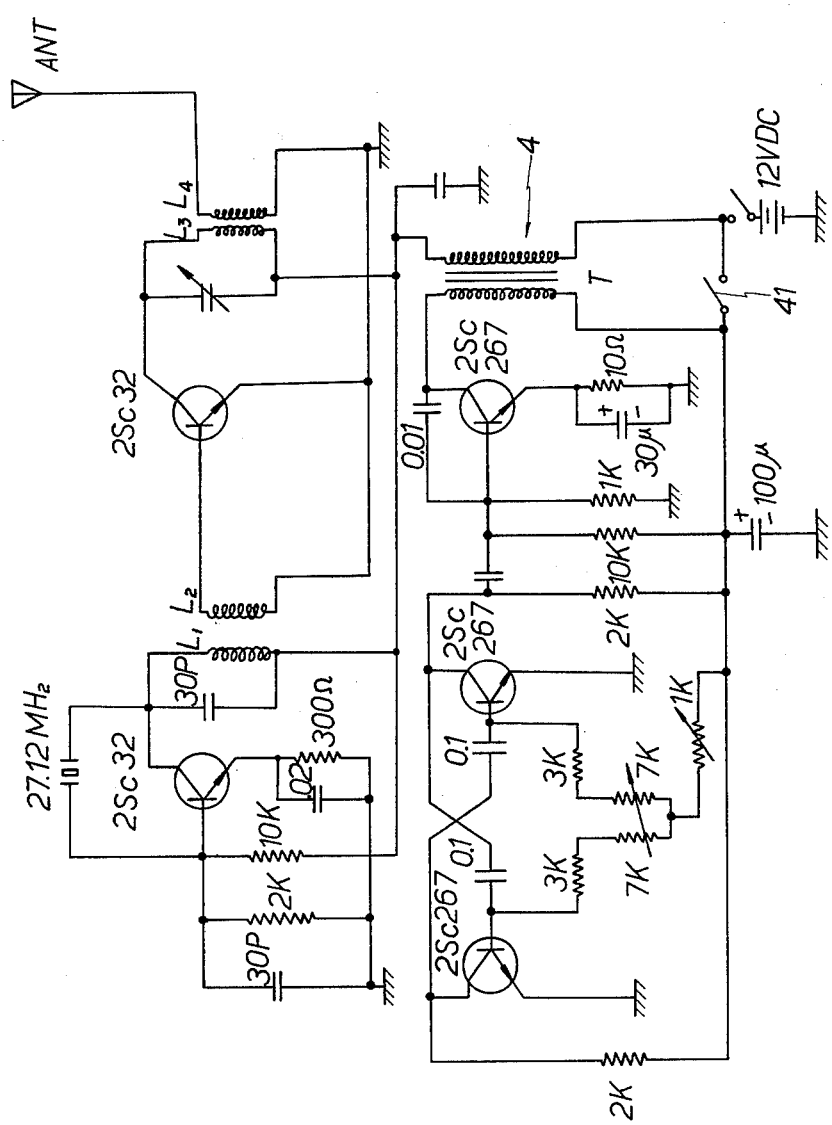
FIG. 6 is an electrical schematic of the remote control transmitter.

Operation of the remote control boat is accomplished by means of radio signals transmitted by the operator over remote control transmitter 4. The transmitter operates on a carrier frequency of 27.12 MHZ which is modulated by a signal of 600+100 HZ and controls the operation of the remote control boat rudder in a proportional manner. The activation of the tow line release servo motor 163 is achieved by the elimination of the modulation of the 27.12 MHZ signal. This demodulation or elimination of the modulation signal is accomplished by opening switch 41 as shown in FIG. 6 such that the antenna transmits only the 27.12 MHZ signal.

Figure 7:
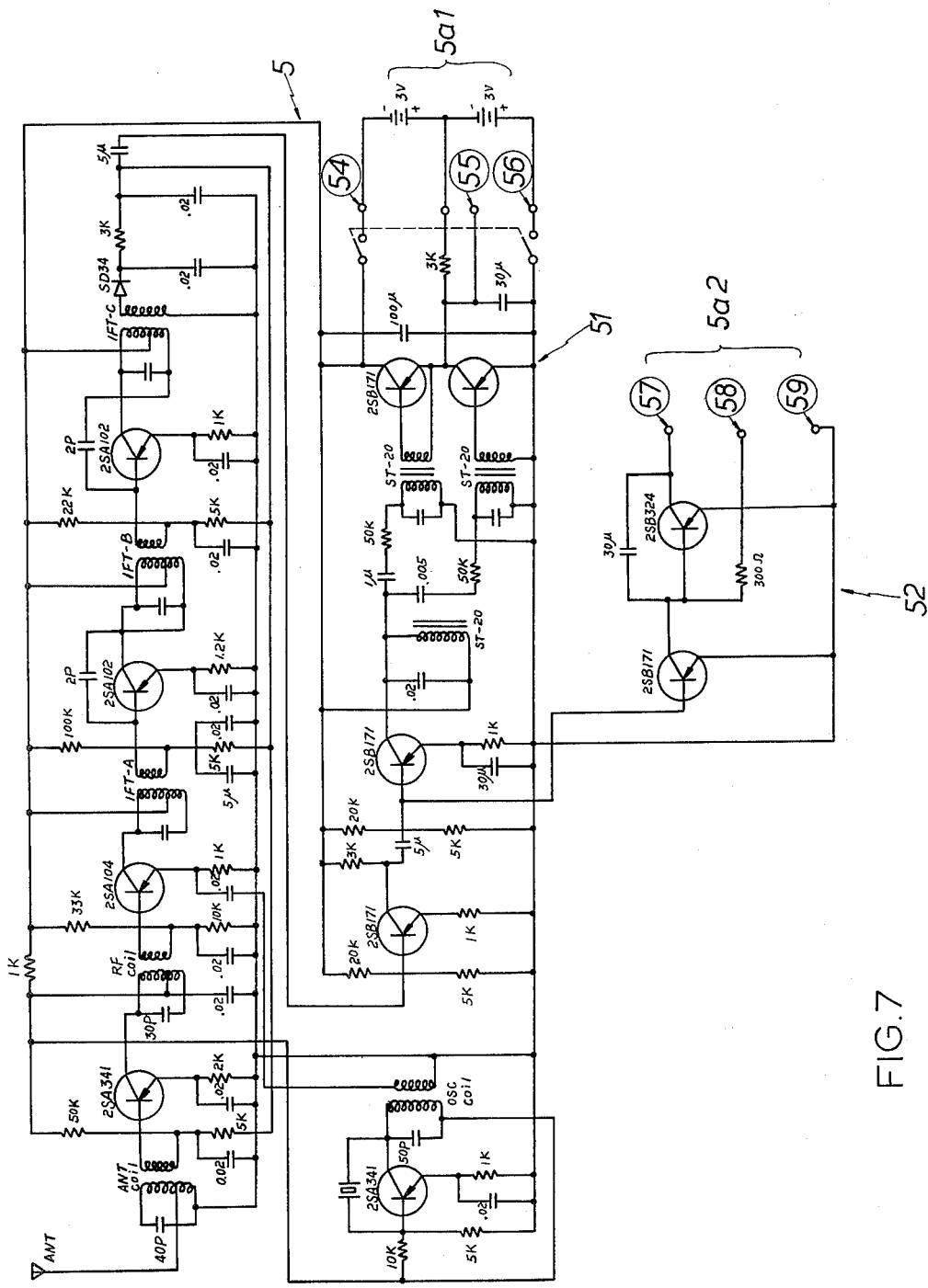
FIG. 7 is an electrical schematic of the remote control receiver.
Figure 8:
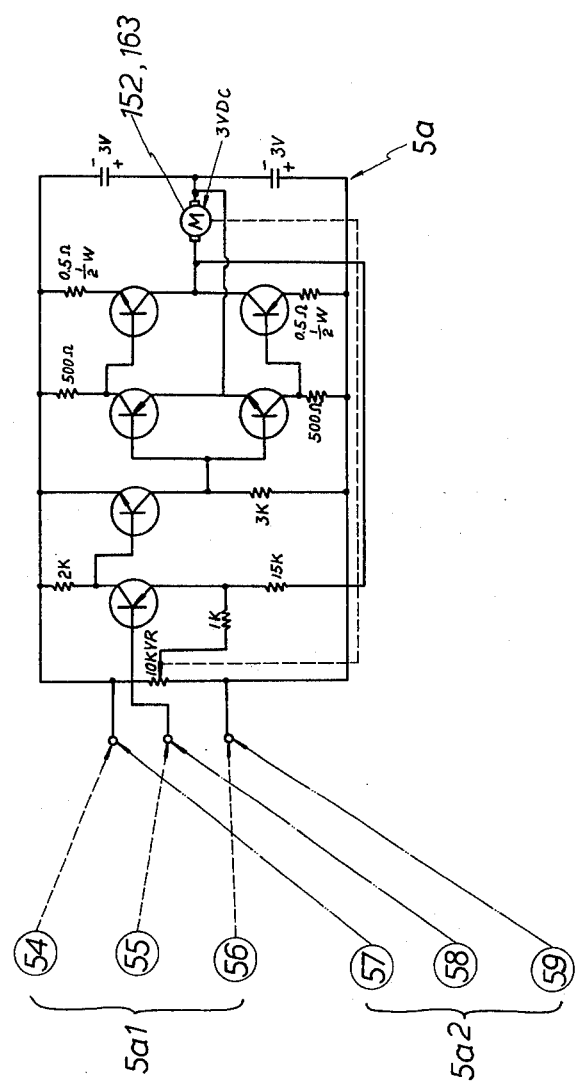
FIG. 8 is an electrical schematic of the control circuits for the steering and tow lines release servo motors on the remote control boat.

The remote control receiver 5, as shown in FIG. 7, is conventional in manner and provides a proportionate control signal to the rudder control circuits 5a shown in FIG. 8. The rudder control circuits 5a supply the actuation signals to the rudder control servo motor and to the tow line release servo motor, 152 and 163, respectively.

Figure 9A:
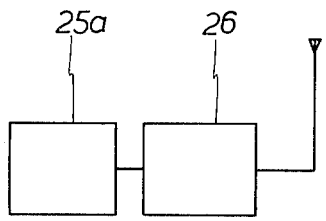
FIGS. 9a and 9b are a block diagram and an electrical schematic, respectively, of the capstan activation transmitter in accordance with this invention.
Figure 9C:
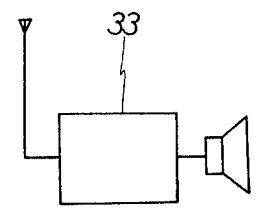
FIG. 9c is a block diagram representing the capstan activation receiver.
Figure 9B:
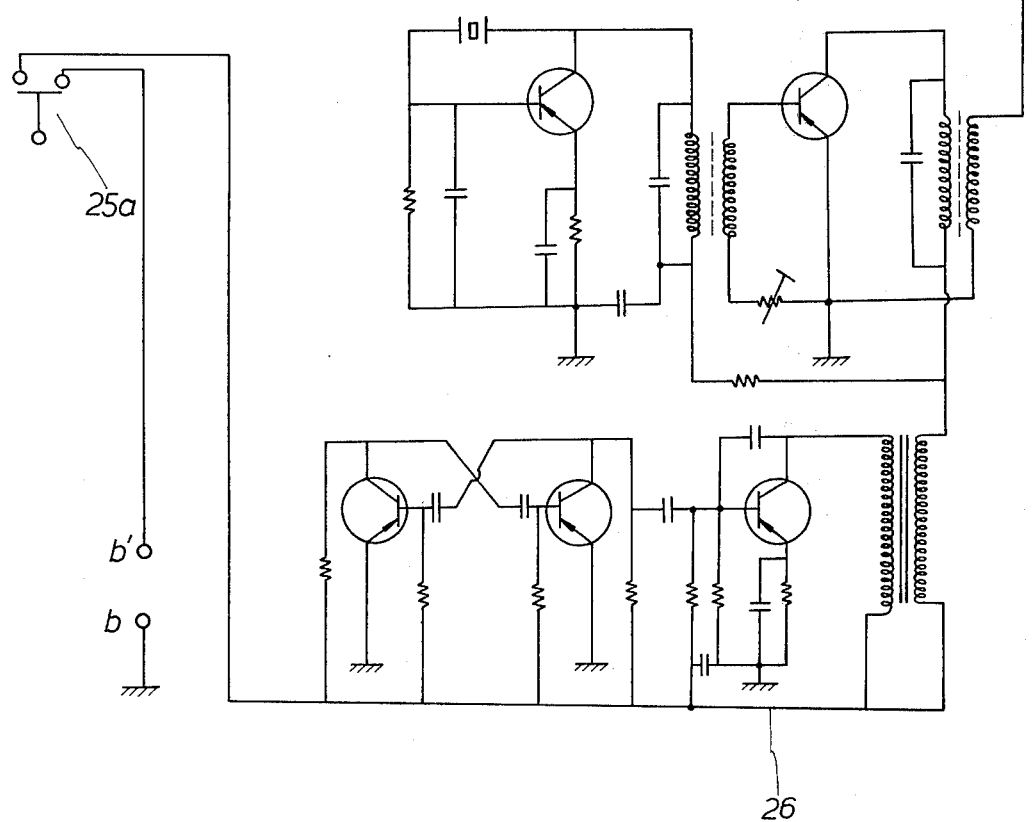
Figure 10:
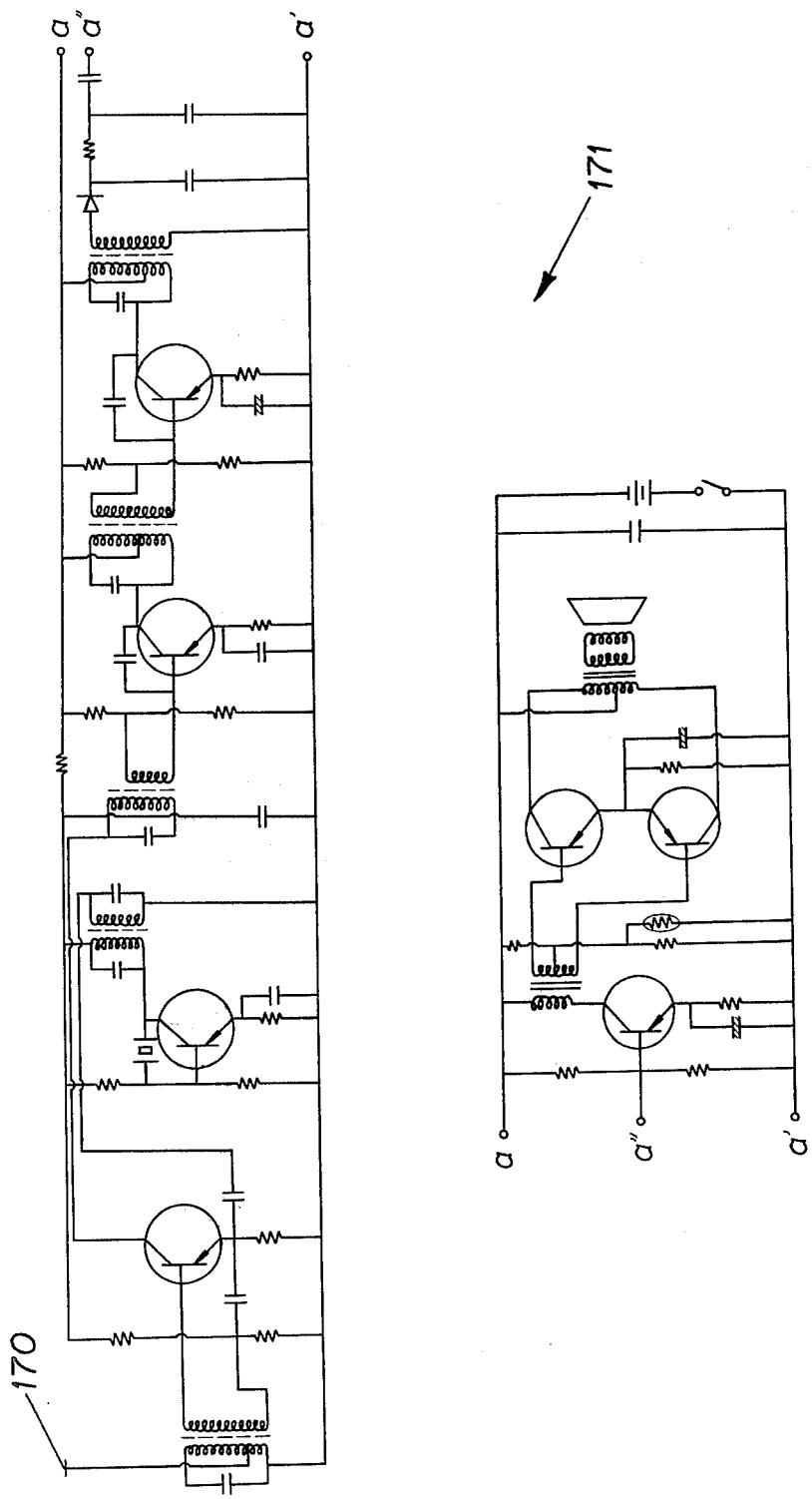
FIG. 10 is an electrical schematic representing the capstan activation receiver.
Figure 12A:
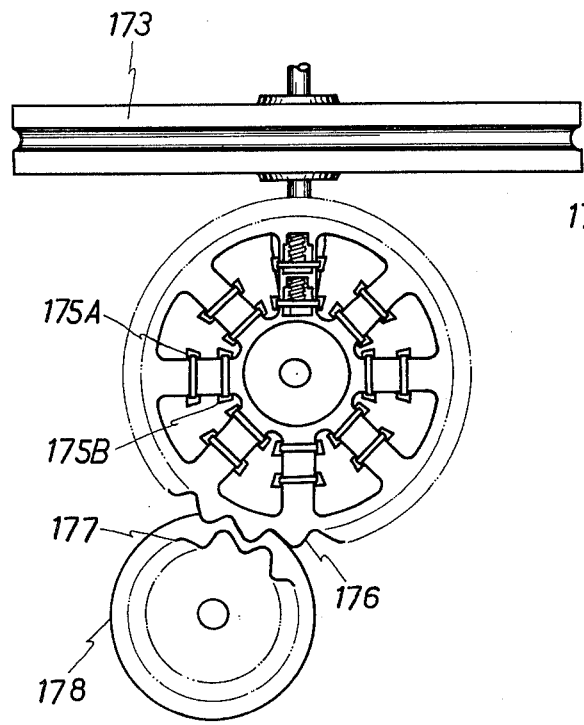
FIGS. 12a, 12b, and 12c are side, end, and top views, respectively, of the slipping clutch mechanism on the capstan retrieval system.
Figure 12C:
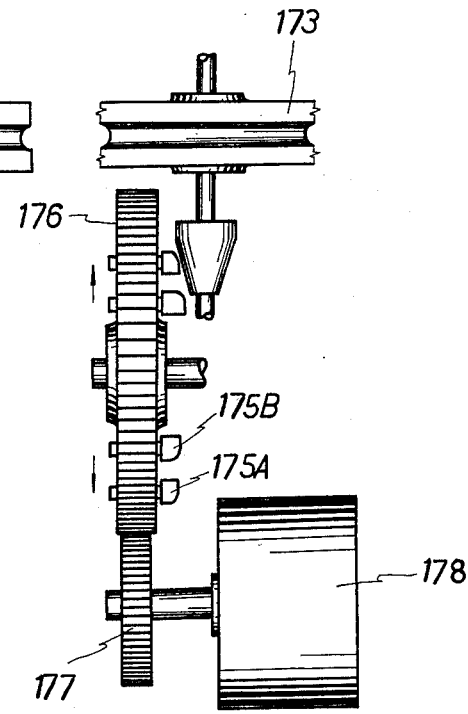
Figure 12B:
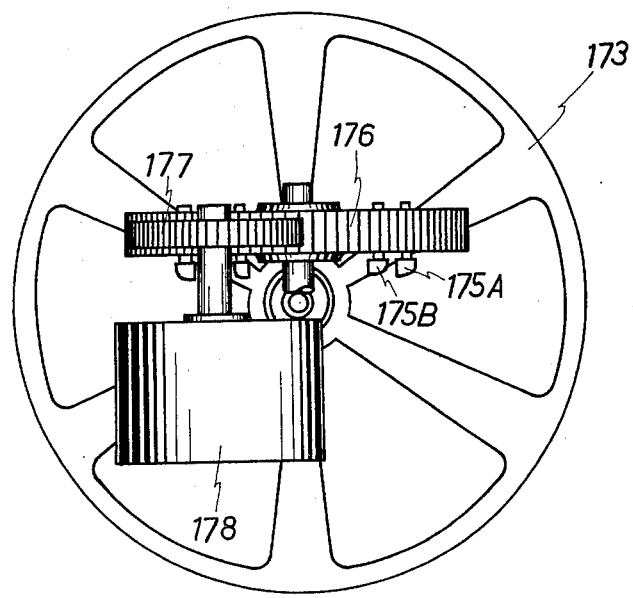
Figure 12D:
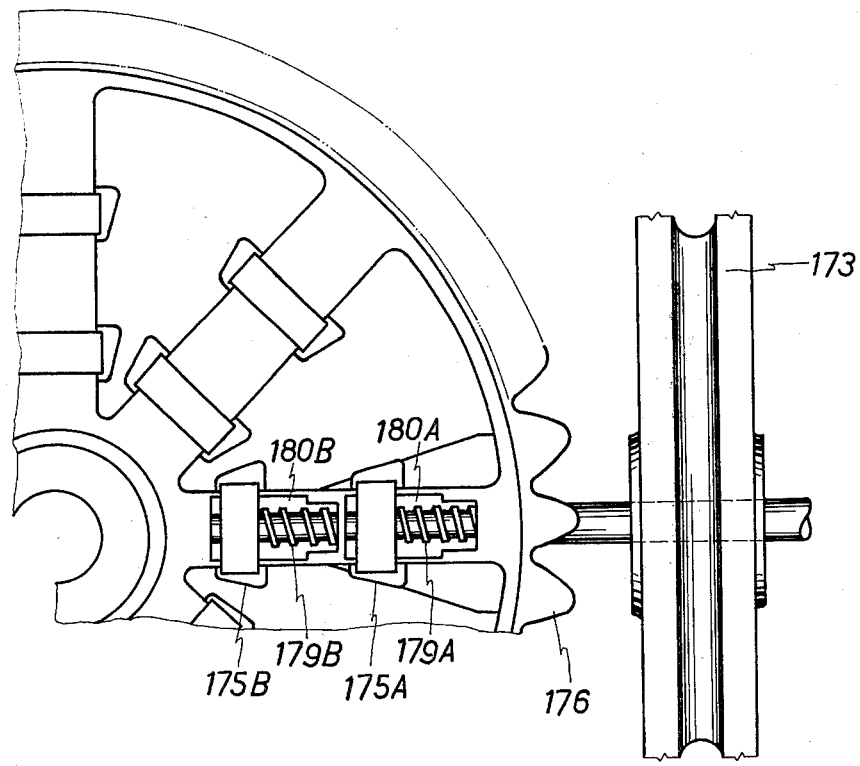
FIGS. 12d and 12e are side and end views, respectively, detailing the operational relationship of the elements of the slipping clutch.
Figure 12E:
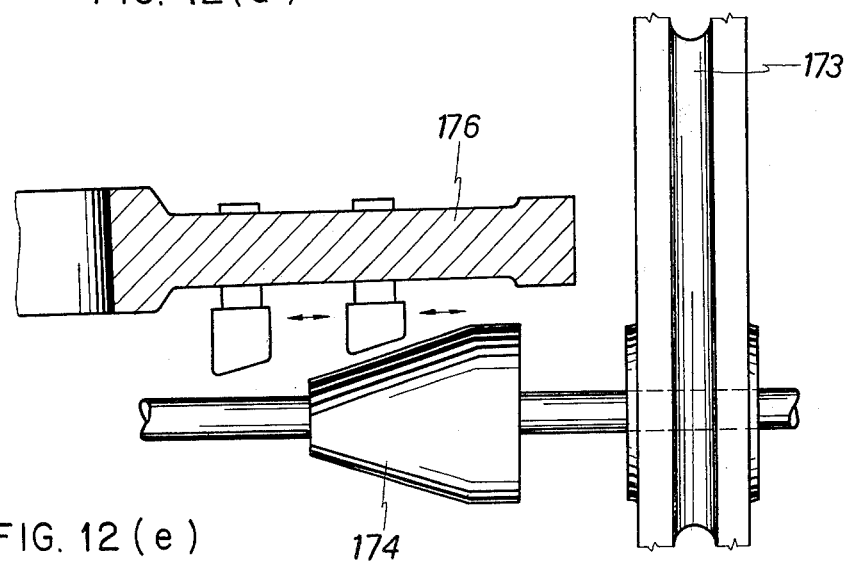

The thrust of the present invention is to the automatic capstan line retrieval system 33. This system is energized by the receipt of a radio signal transmitted from the fishing float 2 indicating that a fish has been hooked. FIG. 9a diagrammatically shows the limit switch 25a and transmitter 26 with FIG. 9b showing an electrical schematic of the same representation. The transmitter provides a radio signal which is received by the capstan activation receiver 171 through antenna 170 diagrammatically shown in FIG. 9c with an electrical schematic depicted in FIG. 10. In FIGS. 11a, 11b, and 11c, the orientation of receiver 171, battery 172, capstan motor 178, the capstan itself 173 and the details of the slippage clutch can be seen. As noted previously, the prior art devices either retrieve the fish at an extremely slow speed because of the gearing necessary to prevent overload of the capstan motor or suffer the risk that when a large fish is hooked, the capstan motor may stall or even be turned against its rotational force with overheating and damage of the motor the result. In the instant invention, this is eliminated by means of the variable ratio slippage clutch the details of which can be seen in FIGS. 12a, 12b, 12c, 12d and 12e.

The variable ratio slippage clutch in a preferred embodiment is comprised of a driving gear 176 and a driven capstan friction piece 174 directly connected to the capstan 173. Mounted in radially outward sliding grooves 180a and 180b are sliding friction pieces 175a and 175b, respectively. Radially outward movement of these sliding friction pieces is opposed by compression springs 179a and 179b, respectively. As can be seen by reference to FIG. 12e, when the driving gear 176 moves at a sufficiently high angular velocity, centrifugal force will tend to slide the friction pieces in a radially outward direction against the force of springs 179a and 179b. It can clearly be seen that a velocity will be reached wherein the sliding friction pieces will contact the capstan friction piece 174. Because the capstan friction piece 174 and the sliding friction pieces are made of materials having a relatively high coefficient of friction, in a preferred embodiment cast iron, when contact is made there between, the circular velocity of the sliding friction piece 175a will impart a rotational velocity on friction piece 174 at the point of contact causing the capstan 173 to rotate and reel in the primary fishing line 3.

It can be seen that sliding friction piece 175b extends closer to capstan friction piece 174 than does sliding friction piece 175a. This is to effectively permit 175a to first contact the capstan friction piece 174 and then if the rotational speed of the driving gear 176 increases further, the radially outward travel of sliding friction piece 175b will contact the capstan friction piece 174 also. It should be noted however that sliding friction piece 175b will contact capstan friction piece 174 at a point where the rotational diameter of the capstan friction piece is considerably smaller than the rotational diameter at the point where sliding friction piece 175a contacts the capstan friction piece. Thus, although the circular velocity of sliding friction piece 175b will be less than the circular velocity of sliding friction piece 175a (because it is closer to the center of rotation of driving gear 176) because of the smaller diameter of capstan friction piece 174 at the point of contact, the rotational speed of the capstan 173 will be increased further than would be possible with sliding friction piece 175a contacting capstan friction piece 174 at the larger diameter point.

Thus, it can be seen that the rotational speed of driving gear 176 will determine which if any of the sliding friction pieces will contact the capstan friction piece 174. Conversely if a very heavy load on the capstan (such as an extremely large fish being inadvertently hooked) the speed of rotation will be severely reduced causing the rotational speed of driving gear 176 to be reduced. The speed reduction reduces the centrifugal force in a radially outward direction and will allow springs 179 to gradually move the sliding friction pieces radially inward to reduce both the gear ratio (the difference between friction piece 175b's contact point and sliding friction piece 175a's contact point with the capstan friction piece 174) and the actual time of contact between the friction pieces (note that the circumferential gap between sliding friction pieces 175a is larger than the circumferential gap between sliding friction pieces 175b). Thus the capstan motor 178 by means of primary gear 177, will be able to constantly rotate driving gear 176 regardless of the load on the capstan 173.

This feature then overcomes the prior art deficiencies in terms of over loading of the capstan motor which normally could be brought to a halt or even reversed in direction of operation should a large fish exert an extremely strong pull on the primary fishing line 3.

The basic sequence of operation of the applicant's fishing device is as follows. The automatic capstan line retrieval system 33 is firmly fixed on the shore. The remote control boat 1 by means of tow line 17 and the tow line hook 161 is connected to the fishing float 2. Timer 24 is set to the desired time delay after which the secondary fishing line 3a will be released. The remote control transmitter 4 is used to control the movement of remote control boat 1 in towing the fishing float into the desired deeper water. After the preset time interval, the line control motor 22 will let out the secondary fishing line 3a until turned off by limit switch 25. The remote control boat can either continue towing the float back and forth through a desired fishing area or can release the fishing float 2.

In order to release the fishing float, switch 41 is opened in remote control transmitter 24 eliminating the modulation of the carrier frequency of the transmitter. This is sensed by the remote control receiver 5 which actuates the tow line release servo motor 163. At this point the remote control boat can be controlled back to the operator and picked up and the operator is free to address other tasks. When a fish is hooked, the pull on the secondary fishing line 3a will actuate limit switch 25a causing energization of the capstan activation transmitter 26. The transmitter sends a signal which is received through antenna 170 by the capstan activation receiver. The receiver activates the capstan motor 178 which begins retrieval of the primary fishing line on the capstan 173. As has been previously noted, a normal size fish cannot exert an extremely strong pull on the primary fishing line and thus the sliding friction pieces (because of the centrifugal force of the high speed rotation of driving gear 176) will be extended into the "higher gearing" position with a resultant fast retrieval of the fish. However, if perchance a very large fish is hooked, the force on the capstan 173 will slow down the rotation of the driving gear 176 such that springs 179 will overcome the centrifugal force and place the sliding friction pieces in a "low gear" position. Thus while the large fish is struggling, the capstan motor will continue rotation but the capstan itself can either be retrieving the line at a very slow rate, stopped or actually allowing some line to go out. Thus the motor maintains its rotation under all circumstances.

It is to be understood that the form of the invention herein described is to be taken as a preferred embodiment only. Numerous modifications and variations on this will become obvious to those of ordinary skill in the art in view of the applicant's teachings. Many different forms of remote control boat, fishing float, and the various transmitters, relays, timers and switches are well known in the remote control art and their substitution or interchangeability, dependent on the specific requirements, would be considered obvious in view of the applicant's teachings. Various designs for a variable ratio slippage clutch can be envisioned in view of the present teachings and thus the applicant's invention is not believed limited to the embodiment disclosed but rather only by the claims appended hereto.

What is claimed is:

1. An automatic fishing system for catching fish with an automatic fishing line retrieval which will eventually reel in a hooked fish regardless of the drag of the fish on the line, said system comprising:
   a capstan retrieval means for recovering a primary fishing line, said capstan retrieval means including a capstan activation receiver means for activating a capstan motor upon receipt of a preset radio signal;
   a fishing float means, connected to said capstan retrieval means by a primary fishing line, said float means including a line control motor means for controllably dispensing a secondary fishing line and a radio signal transmission means, responsive to forces applied to said secondary fishing line, for sending said preset radio signal to said capstan receiver means; and
   a radio controlled boat means, controllably connected to said fishing float means, for controllably towing said fishing float means to a desired fishing location.

2. The automatic fishing system in claim 1 wherein said capstan retrieval means in addition to said capstan activation receiver means, comprises:
   a capstan means for rewinding said primary fishing line;
   a capstan motor for powering said capstan means in rewinding said primary fishing line; and
   a slippage clutch means for controllably connecting said motor to said capstan means.

3. The automatic fishing system according to claim 2 wherein said slippage clutch means comprises:
   a driving gear means connected to said capstan motor;
   a driven capstan friction piece means connected to said capstan means; and
   at least one sliding friction piece means, mounted on said driving gear, for making intermittent frictional contact with said capstan friction piece means and transmitting rotational power from said driving gear means to said frictional piece means and thereby operate said capstan means for rewinding said primary line.

4. The automatic fishing system according to claim 3 wherein said driven capstan friction piece means comprises a frusto-conical portion connected to said capstan means and mounted for rotation about an axis of rotation, said sliding friction piece means comprises a plurality of sliding friction pieces, each mounted to be slidable in a radially outward direction on said driving gear means, each of said sliding friction pieces including spring means for opposing radially outward movement of said sliding friction pieces, said driving gear means mounted for rotation about an axis of rotation such that said sliding friction pieces contact said capstan friction piece means at a given rotational speed of the driving gear means and transmits rotational power thereto.

5. The automatic fishing system according to claim 4 wherein said plurality of sliding friction pieces comprise a first group and a second group and said spring means comprises a first spring group and a second spring group, said first spring group acting upon said sliding friction piece first group and said second spring group acting upon said sliding friction piece second group, said sliding friction piece groups and said spring groups combining to provide a variable ratio slippage clutch means for frictionally engaging said frusto-conical portion of said capstan friction piece means, said first group of sliding friction pieces engaging said capstan friction piece means at a first driving gear rotational speed and said second group of sliding friction pieces engaging said capstan friction piece means at a second driving gear rotational speed.

* * * * *